US009658638B2

(12) United States Patent
Athalye (10) Patent No.: US 9,658,638 B2
(45) Date of Patent: May 23, 2017

(54) BUCK-BOOST VOLTAGE CONVERTER CIRCUITS FOR SOLID STATE LIGHTING APPARATUS (71) Applicant: Cree, Inc., Durham, NC (US)

(72) Inventor: Praneet Jayant Athalye, Morrisville, NC (US)

(73) Assignee: Cree, Inc., Durham, NC (US)

(*) Notice: Subject to any disclaimer, the term of this patent is extended or adjusted under 35 U.S.C. 154(b) by 271 days.

(21) Appl. No.: 13/827,224

(22) Filed: Mar. 14, 2013

(65) Prior Publication Data
US 2014/0266125 A1 Sep. 18, 2014

(51) Int. Cl.
G05F 1/24 (2006.01)
G05F 5/00 (2006.01)
H02M 3/156 (2006.01)
H05B 33/08 (2006.01)
H02M 1/00 (2006.01)

(52) U.S. Cl.
CPC .............. G05F 5/00 (2013.01); H02M 3/156 (2013.01); H05B 33/0815 (2013.01); H02M 2001/0003 (2013.01)

(58) Field of Classification Search
CPC ...... H02M 3/156; H02M 3/158; H02M 3/157; H02M 3/1588; H02M 3/1582; H02M 3/155; H02M 3/1584; H02M 1/4225; H02M 1/4208; H02M 1/081; H02M 1/40; H02M 3/33507; H02M 2001/0032; H02M 2001/0009; H02M 2001/0012; H02M 2001/0045; G05F 1/613; G05F 1/607; G05F 1/42; G05F 1/66; G05F 1/445; G05F 1/32; G05F 1/12; G05F 1/24; G05F 1/34; G05F 1/26; G05F 1/44; G05F 3/12; G05F 3/16; G05F 3/04
USPC ....... 323/222, 223, 229, 230, 240, 249, 259, 323/261, 263, 268, 271, 272, 282–285
See application file for complete search history.

(56) References Cited

U.S. PATENT DOCUMENTS

| 7,388,359 B1 * | 6/2008 | Ling .............................. 323/284 |
| 8,476,888 B1 * | 7/2013 | Chen et al. .................... 323/284 |
| 8,749,173 B1 * | 6/2014 | Melanson et al. ............. 315/307 |
| 9,293,944 B2 * | 3/2016 | Ma ..................... H05B 33/0815 |
| 2007/0170897 A1 * | 7/2007 | Williams ..................... 323/222 |

(Continued)

OTHER PUBLICATIONS

"Buck-boost converter". Wikipedia article: http://en.wikipedia.org/wiki/Buck%E2%80%93boost_converter.*

Primary Examiner — Jue Zhang
Assistant Examiner — Kevin H Sprenger
(74) Attorney, Agent, or Firm — Coats & Bennett, PLLC (57) ABSTRACT A voltage converter includes a converter circuit and a control circuit coupled to the converter circuit and configured to selectively operate the converter circuit in a boost mode or a floating buck mode in response to a level of an input voltage supplied to the voltage converter circuit. The converter circuit may further include an inductor, a first control switch coupled to the control circuit, and a second control switch coupled to the control circuit. The control circuit may be configured to control a state of the first control switch in the boost mode in response to a level of current in the inductor, and the control circuit may be configured to control a state of the second control switch in the floating buck mode in response to the level of current in the inductor.

18 Claims, 5 Drawing Sheets (56) References Cited

U.S. PATENT DOCUMENTS

| | | | |
|---|---|---|---|
| 2008/0084197 A1* | 4/2008 | Williams | H02M 1/38 |
| | | | 323/282 |
| 2009/0039869 A1* | 2/2009 | Williams | 324/123 R |
| 2011/0148324 A1* | 6/2011 | Du et al. | 315/297 |
| 2013/0083578 A1* | 4/2013 | Kotowski et al. | 363/126 |

* cited by examiner

BUCK-BOOST VOLTAGE CONVERTER CIRCUITS FOR SOLID STATE LIGHTING APPARATUS

FIELD

The present inventive concepts relate to voltage converter circuits, and, more particularly, to buck-boost voltage converter circuits for solid state lighting apparatus.

BACKGROUND

Solid-state lighting arrays are used for a number of lighting applications. For example, solid-state lighting panels including arrays of solid-state light emitting devices have been used as direct illumination sources, for example, in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Typically, a solid-state light emitting device generates light through the recombination of electronic carriers, i.e. electrons and holes, in a light emitting layer or region. A solid-state light emitting device may include, for example, a packaged light emitting device including one or more light emitting diodes (LEDs).

Cree, Inc. produces a variety of recessed downlights, such as the LR-6 and CR-6, which use LEDs for illumination, as well as a variety of LED bulbs intended to replace standard incandescent bulbs. Solid-state lighting panels are also commonly used as backlights for small liquid crystal display (LCD) screens, such as LCD display screens used in portable electronic devices, and for larger displays, such as LCD television displays.

Solid state lighting devices are typically powered with a DC signal. However, power is conventionally delivered in AC form. It is therefore generally desirable for a solid state light fixture to include an AC to DC converter to convert AC line voltage to a DC voltage.

Boost converters can be used to generate DC voltage from an AC line voltage with high power factor and low total harmonic distortion. The voltage of an LED-based load may be higher than the peak of the input (line) AC voltage. In that case, a single-stage boost converter can be employed as the driver, achieving high power efficiency and low cost. For example, a power factor corrected (PFC) boost converter which converts 120V AC, 60 Hz, to 200-250V DC output could be used to drive an array of high-voltage (HV) LEDs at a power level of 10-15 W.

In some cases, however, the voltage of an LED-based load may be lower than the peak of the input voltage waveform. In that case, it may be desirable to use a buck-boost converter that is capable of supplying an output DC voltage that is either higher or lower than the input voltage.

SUMMARY

A voltage converter according to some embodiments includes a converter circuit and a control circuit coupled to the converter circuit and configured to selectively operate the converter circuit in a boost mode or a floating buck mode in response to a level of an input voltage supplied to the converter circuit.

The converter circuit may further include an inductor, a first control switch coupled to the control circuit, and a second control switch coupled to the control circuit. The control circuit may be configured to control a state of the first control switch in the boost mode in response to a level of current in the inductor, and the control circuit is configured to control a state of the second control switch in the buck mode in response to the level of current in the inductor.

The converter circuit may further include a first diode coupled to the inductor, and an output capacitor coupled to the first diode. The first control switch is coupled to the inductor, and the second control switch is coupled to the output capacitor.

The converter circuit may further include a second diode coupled between the output capacitor and the second control switch, and a third diode coupled between the second diode and an input terminal that receives the input voltage.

The control circuit may be coupled to a gate of the first control switch and be configured to provide a first control signal to the gate of the first control switch, and the control circuit may coupled to a gate of the second control switch and be configured to provide a second control signal to the gate of the second control switch.

The control circuit maybe coupled to a source of the first control switch and be configured to turn the first control switch ON by selectively coupling the source of the first control switch to ground, and the control circuit may be coupled to a source of the second control switch and be configured to turn the second control switch ON by selectively coupling the source of the second control switch to ground.

The control circuit may further include first and second internal switches coupled in cascode configuration with the first and second control switches, respectively.

The converter circuit may be configured to discharge energy stored in the inductor through the third diode when the second control switch is turned OFF when the voltage converter is operated in the buck mode.

Both the first and second control switches may be referenced to a common ground with the input voltage.

A control circuit for a voltage converter including an inductor and first and second control switches includes a first input that receives an inductor current signal, a second input that receives an input voltage signal, a third input that receives an output voltage signal, a first output coupled to the first control switch, and a second output coupled to the second control switch. The control circuit is configured to operate the voltage converter in one of a boost mode and a buck mode in response to a level of the input voltage relative to a level of the output voltage. In the boost mode, the control circuit is configured to turn ON the second control switch and to control a state of the first control switch in response to a level of current in the inductor, and in the buck mode, the control circuit is configured to turn OFF the first control switch and to control a state of the second control switch in response to the level of current in the inductor.

The first output of the control circuit may be coupled to a control terminal of the first control switch and the second output of the control circuit may be coupled to a control terminal of the second control switch. The control circuit may be configured to control a state of the first control switch by supplying a first control signal to the control terminal of the first control switch, and the control circuit may be configured to control a state of the second control switch by supplying a second control signal to the control terminal of the second control switch.

The first output of the control circuit may be coupled to an output terminal of the first control switch and the second output of the control circuit may be coupled to an output terminal of the second control switch. The control circuit may be configured to control a state of the first control switch by selectively coupling the output terminal of the first control switch to ground, and to control a state of the second control switch by selectively coupling the output terminal of the second control switch to ground.

A voltage converter circuit according to further embodiments includes an input node configured to receive an input voltage, an inductor having a first terminal coupled to the input node and having a second terminal, a first diode having an anode coupled to a second terminal of the inductor and a cathode coupled to an output node, a capacitor having a first terminal coupled to the output node and having a second terminal, a second diode having an anode coupled to the second terminal of the capacitor and having a cathode, a third diode having an anode coupled to the anode of the second diode and having a cathode coupled to the input terminal, a first switch having a first terminal coupled to the second terminal of the inductor, and having a second terminal, a second switch having a first terminal coupled to the cathode of the second diode and having a second terminal, and a control circuit coupled to the second terminal of the first switch and the second terminal of the second switch and configured to control a respective state of the first switch and the second switch.

The control circuit may be configured to turn the second control switch ON and control a state of the first control switch in a boost mode in response to a level of current in the inductor, and to turn the first control switch OFF and control a state of the second control switch in a buck mode in response to the level of current in the inductor.

The second terminal of the first control switch may be a gate terminal, and the control circuit may be configured to provide a first control signal to the gate terminal of the first control switch. The second terminal of the second control switch may be a gate terminal, and the control circuit may be configured to provide a second control signal to the gate terminal of the second control switch.

The second terminal of the first control switch may be a source of the first control switch, and the control circuit may be configured to turn the first control switch ON by selectively coupling the source of the first control switch to ground. The second terminal of the second control switch may be a source terminal, and the control circuit may be configured to turn the second control switch ON by selectively coupling the source terminal of the second control switch to ground.

The control circuit may include first and second internal switches coupled in cascode configuration with the first and second control switches, respectively.

The voltage converter circuit may be configured to discharge energy stored in the inductor through the third diode when the second control switch is turned OFF when the voltage converter is operated in the buck mode.

A voltage converter according to further embodiments includes a converter circuit and a control circuit coupled to converter circuit and configured to selectively operate the converter circuit, in response to a level of an input voltage supplied to the voltage converter circuit, in a first mode of operation having a first circuit topology or a second mode of operation having a second topology that is different from the first topology.

The first mode of operation may include a boost mode and the second mode of operation may include a buck mode. The first circuit topology may have a first circuit element that is common to the second circuit topology and a second circuit element that is not common to the second circuit topology.

The first circuit element may include an inductor or a capacitor, and the second circuit element may include a diode.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION OF EMBODIMENTS

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

Some embodiments of the present inventive subject matter provide a voltage converter that includes a boost converter combined with a floating buck converter. Some embodiments may be particularly suited for driving a solid state lighting apparatus. A boost-buck converter according to some embodiments may be particularly useful for driving a solid state lighting apparatus having a DC output voltage requirement of, for example, 75 V to 150 V that is less than a peak voltage of a conventional 120 VAC power source.

A converter topology according to some embodiments may allow for an efficient buck-boost solution where for example the input voltage is 230 VAC and the output voltage is 230 VDC. A conventional non-isolated buck-boost converter or a flyback converter which can step up or step down the voltage may suffer from low efficiency and/or high peak current stress, and may require a larger size inductor because of indirect energy transfer. Operating a topology in a separate boost mode and buck mode can increase the efficiency since the energy transfer is direct in these modes. It may also allow for a reduction in the size and/or cost of the inductor. Further, separate boost and buck operation may reduce the size and/or cost of the electromagnetic interference filter. Although, it may seem that more semiconductors devices are added, it may be possible to integrate all the silicon, the switches and the diodes into one compact package, thereby reducing overall cost.

Moreover, a converter topology according to some embodiments may be particularly suited for use in connection with a solid state lighting apparatus that does not have a heat sink that may be connected to the power ground or earth reference, such as, for example, a solid state lighting apparatus that is used as a light bulb replacement.

Some particular embodiments employ two low-side control switches that are controlled by a single control circuit. One switch may act as a control switch during boost mode operation, while the other switch may act as the control switch during buck mode operation. Because both of the two control switches, including the buck mode control switch, are referenced to ground, the switches may be easier to control.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

Figure 1:
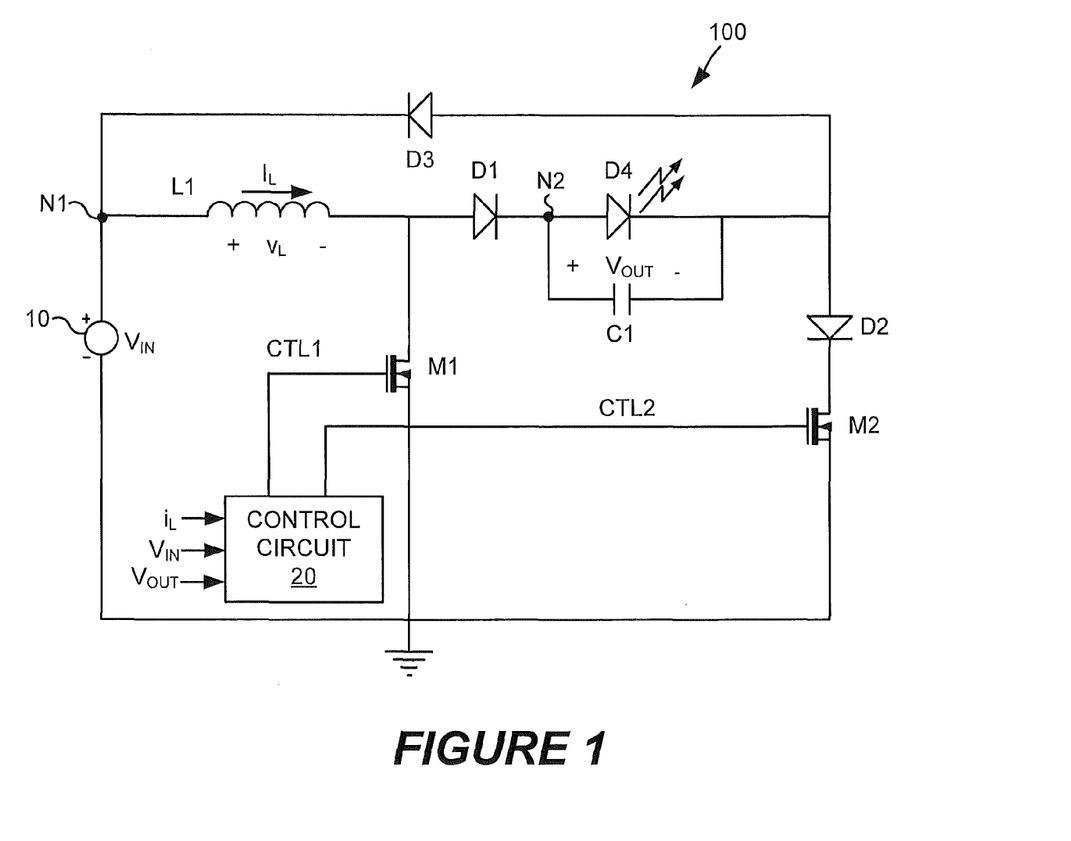
FIG. 1 is a circuit diagram of a voltage converter in accordance with some embodiments.

Referring to FIG. 1, a voltage converter circuit 100 according to some embodiments is illustrated. The voltage converter circuit 100 receives a rectified AC input waveform $V_{IN}$ generated by a voltage source 10. The voltage converter circuit includes an inductor L1 coupled to the voltage source 10, diodes D1, D2 and D3, first and second control switches M1 and M2, an output capacitor C1, and a control circuit 20.

The control circuit 20 controls the state of the control switches M1 and M2 via control signals CTL1, CTL2 that are generated in response to levels of the input voltage $V_{IN}$ and output voltage $V_{OUT}$, which are supplied as inputs to the control circuit 20.

Although illustrated as N-channel MOSFETs, the control switches M1, M2 can be implemented using many different elements, including P-channel MOSFETs, bipolar transistors, etc.

Both of the first and second control switches M1, M2 are referenced to a common ground with the voltage source 10 at their respective source terminals.

A solid state load is represented by the light emitting diode D4. The load may include a plurality of light emitting diodes connected in series, parallel, series-parallel, or other configurations.

The inductor L1, diode D1, capacitor C1, first control switch M1, and control circuit 20 function as a boost converter circuit when the second control switch M2 is ON (i.e., when the second control switch M2 is in a conducting state). That is, when the second control switch M2 is ON, the current through the inductor L1 is controlled by the first control switch M1, which is in turn controlled by the control circuit 20, as will be discussed in more detail below.

According to some embodiments, the voltage converter circuit 100 includes an input node N1 at which an input voltage is received. The inductor L1 includes a first terminal coupled to the input terminal N1. The first diode D12 has an anode coupled to a second terminal of the inductor and a cathode coupled to an output node N2. The capacitor C1 has a first terminal coupled to the output node N2. The second diode D2 has an anode coupled to a second terminal of the capacitor C1. A third diode D3 has an anode coupled to the anode of the second diode D2 and has a cathode coupled to the input node N1. The first switch M1 has a first terminal (e.g. a drain terminal) coupled to the second terminal of the inductor L1 and has a control terminal (e.g. a gate terminal). The second switch M2 has a first terminal (e.g. a drain terminal) coupled to the cathode of the second diode D2 and has a control terminal (e.g. a gate terminal). The control circuit 20 is coupled to the control terminal of the first switch M1 and the control terminal of the second switch M2 and is configured to control a respective state of the first switch M1 and the second switch M2.

In some embodiments, the control circuit 20 is configured to turn the second control switch M2 ON and control a state of the first control switch M1 in a boost mode in response to a level of current in the inductor L1, and to turn the first control switch M1 OFF and control a state of the second control switch M2 in a buck mode in response to the level of current in the inductor L1, based on the level of the voltage at the input node.

According to some embodiments, the control circuit 20 is configured to selectively operate the converter circuit 100 in a first mode of operation (e.g., boost mode) having a first circuit topology or a second mode of operation (e.g. buck mode) having a second topology that is different from the first topology, in response to a level of an input voltage supplied to the voltage converter circuit.

The first circuit topology may have at least one circuit element, such as the inductor L1 or capacitor C1, that is common to the second circuit topology and at least one circuit element that is not common to the second circuit topology, such As the diode D2 or the diode D3.

When the switch M1 is held in the OFF state, the inductor L1, diodes D1, D2 and D3, capacitor C1, second control switch M2 and control circuit 20 function as a floating buck converter circuit, as will be described in more detail hereafter.

Figure 2A:
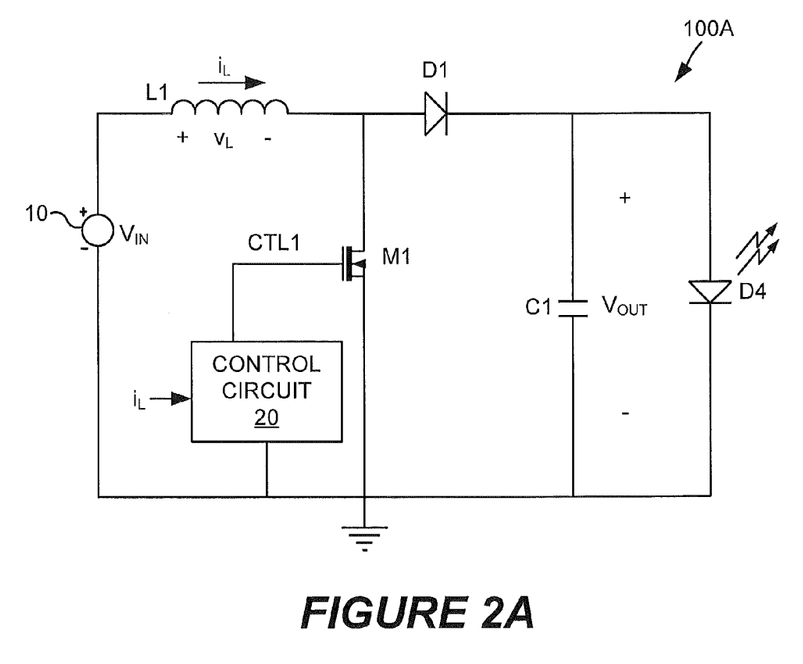
FIG. 2A is a circuit diagram of an example boost converter.

The operation of a boost converter is illustrated with reference to FIGS. 2A and 2B. FIG. 2A is a circuit diagram of a boost converter 100A, while FIG. 2B is a graph of hypothetical inductor current 22 in the boost converter 100A of FIG. 2A.

Figure 2B:
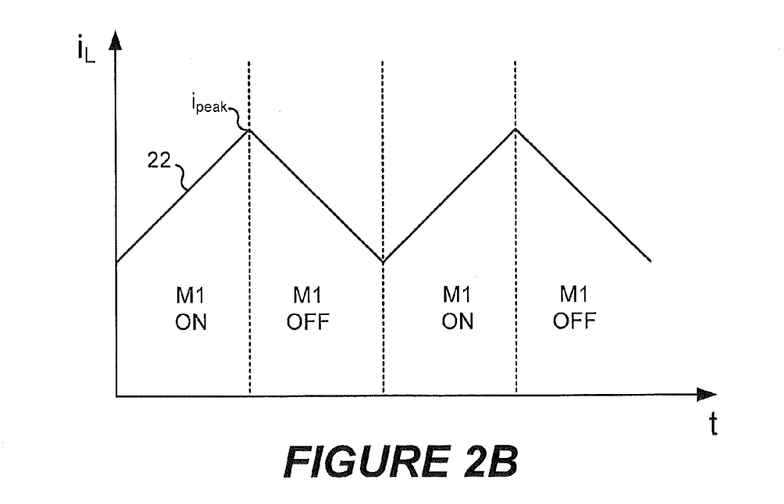
FIG. 2B is a graph of hypothetical inductor current in the boost converter of FIG. 2A.

Referring to FIGS. 2A and 2B, when the first control switch M1 is ON, the entire input voltage appears across the inductor, so that $V_L = V_{IN}$. In that case, the inductor current $i_L$ (shown as curve 22 in FIG. 2A) increases with a slope equal to $V_{IN}/L$ until a peak current $i_{peak}$ is reached. As the current $i_L$ flowing in the inductor L1 increases, energy is stored in the magnetic field of the inductor L1.

While the first control switch M1 is turned ON, power is supplied to the load D4 by the discharge of the output capacitor C1. The diode D1 prevents the output capacitor C1 from discharging back through the first control switch M1.

When the inductor current $i_L$ reaches its peak value, the control circuit 20 turns the first control switch M1 OFF. At that point, energy stored in the magnetic field of the inductor L1 is discharged through the diode D1 and into the output capacitor C1, charging the output capacitor a until the first control switch M1 is turned on again. During this portion of the cycle, the voltage across the inductor is approximately equal to $V_{IN}-V_{OUT}$. The slope of the inductor current is given as $(V_{IN}-V_{OUT})/L$. Since the value of $V_{IN}-V_{OUT}$ is negative during boost operation, the inductor current decreases when the first control switch M1 is OFF.

Figure 3A:
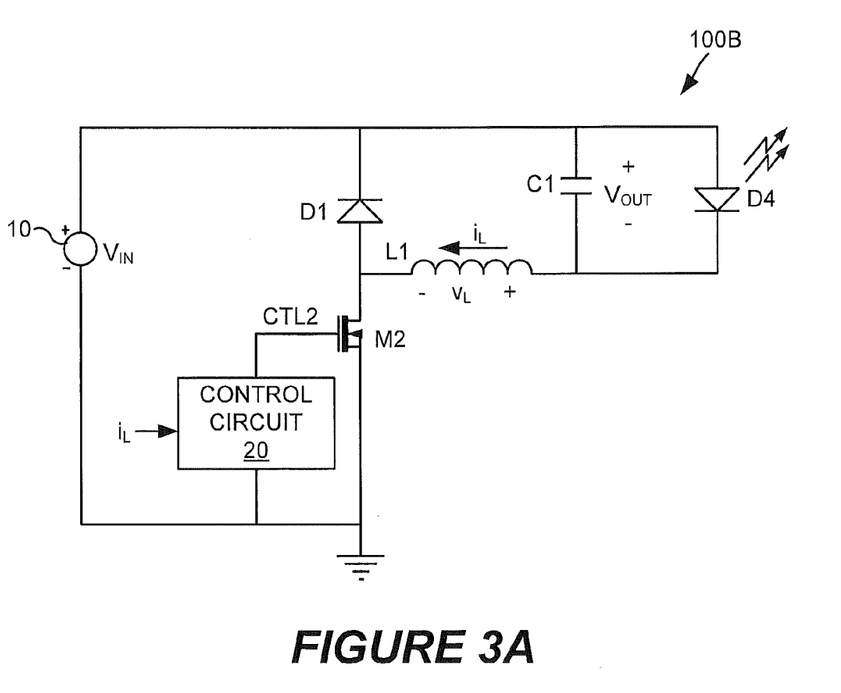
FIG. 3A is a circuit diagram of an example buck converter.

The operation of a floating buck converter is illustrated with reference to FIGS. 3A and 3B. FIG. 3A is a circuit diagram of a floating buck converter 100B, while FIG. 3B is a graph of hypothetical inductor current 32 in the floating buck converter 100B of FIG. 3A.

Figure 3B:
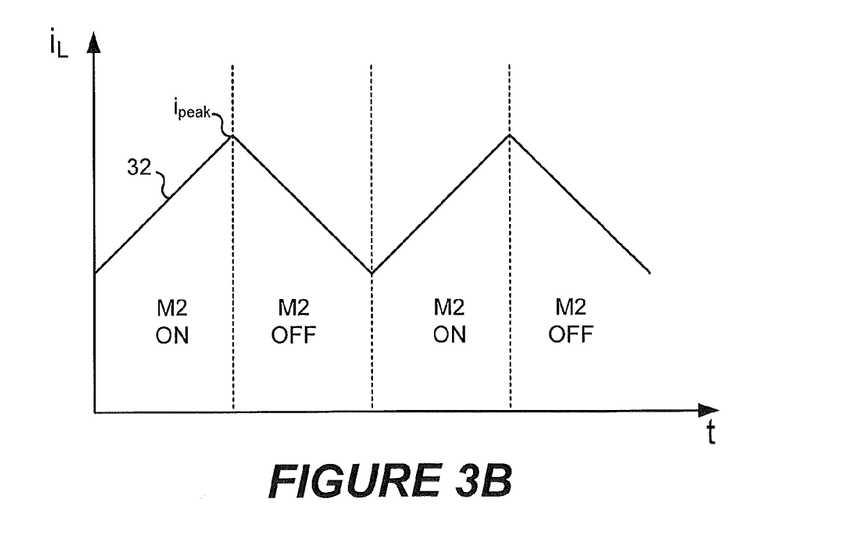
FIG. 3B is a graph of hypothetical inductor current in the buck converter of FIG. 3A.

Referring to FIGS. 3A and 3B, when the second control switch M2 is ON, the voltage across the inductor L1 is approximately equal to $V_{IN}-V_{OUT}$. In buck mode, this value is positive; thus, the inductor current increases with a slope equal to $(V_{IN}-V_{OUT})/L$, as shown in FIG. 3B.

When the inductor current reaches a peak value ($i_{peak}$), the control circuit 20 turns the second control switch M2 OFF. When the second control switch M2 is OFF, the inductor current passes through the diode D1. At that point, the inductor L1 is floating, and the entire output voltage is dropped over the floating inductor, so that the inductor current decreases with a slope equal to $-V_{OUT}/L$.

Referring again to FIG. 1, a boost converter and a floating buck converter are combined in a single boost-floating buck converter 100. This combination is facilitated in some embodiments by the addition of diodes D2 and D3 to the circuit. Moreover, the control circuit 20 selectively operates the converter 100 in boost mode or buck mode depending on the level of the input voltage $V_{IN}$ relative to the output voltage $V_{OUT}$, both of which may be monitored by the control circuit 20.

It may be possible in some embodiments to omit (i.e. replace with a short circuit), either the diode D1 or the diode D2. If the diode D1 is not present, the diode D2 acts as a boost rectifier. If the diode D2 is not present, the cathode of D4 is at a known potential when both the first and second control switches M1 and M2 are on in a boost mode.

Figure 4:
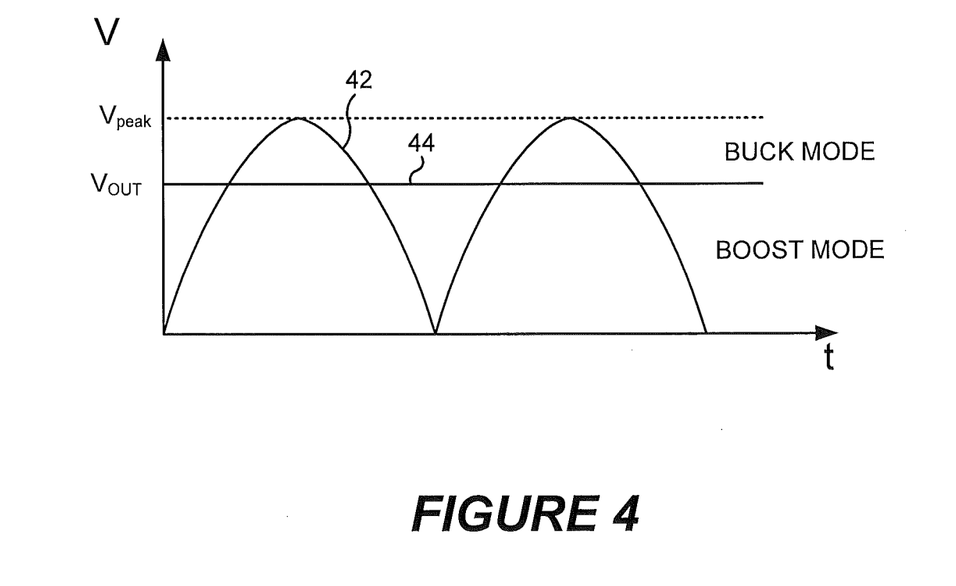
FIG. 4 is a graph of hypothetical input and output voltage waveforms in a voltage converter according to some embodiments.

For example, FIG. 4 is a graph of input voltage $V_{IN}$ (curve 42) and output voltage $V_{OUT}$ (curve 44) for a voltage converter according to some embodiments. As shown therein, when the input voltage $V_{IN}$ is less than the output voltage $V_{OUT}$, the control circuit 20 may operate the voltage converter in boost mode. Conversely, when the input voltage $V_{IN}$ is greater than the output voltage $V_{OUT}$, the control circuit 20 may operate the voltage converter in buck mode.

Returning again to FIG. 1, when the converter 100 is operated in boost mode, the second control switch M2 is turned ON, and the control circuit 20 controls the state of the first control switch M1 based on the level of the inductor current $i_L$. When the control circuit turns the first control switch M1 ON, the entire input voltage appears across the inductor L1, so that $V_L=V_{IN}$. In that case, the inductor current $i_L$ increases with a slope equal to $V_{IN}/L$ until a peak current $i_{peak}$ is reached. As the current $i_L$ flowing in the inductor L1 increases, energy is stored in the magnetic field of the inductor L1.

While the first control switch M1 is turned ON, power is supplied to the load D4 by the discharge of the output capacitor C1. The diode D1 prevents the output capacitor C1 from discharging back through the first control switch M1.

When the inductor current $i_L$ reaches its peak value, the control circuit 20 turns the first control switch M1 OFF. At that point, energy stored in the magnetic field of the inductor L1 is discharged through the diode D1 and into the output capacitor C1, charging the output capacitor C1 until the first control switch M1 is turned on again. During this portion of the cycle, the voltage across the inductor is approximately equal to $V_{IN}-V_{OUT}$. The slope of the inductor current is given as $(V_{IN}-V_{OUT})/L$. Since the value of $V_{IN}-V_{OUT}$ is negative during boost operation, the inductor current decreases when the first control switch M1 is OFF.

Moreover, the voltage at the anode of the diode D2 is less than the level that would be required to turn the diode D3 on. Thus, no current flows through the diode D3 at this time.

When the level of the input voltage $V_{IN}$ rises above the level of the output voltage $V_{OUT}$, the control circuit 20 causes the converter 100 to operate in floating buck mode by turning the first control switch M1 OFF and controlling the state of the second control switch M2 based on the level of the inductor current $i_L$. Because the second control switch M2 is on the low voltage side of the converter circuit and the first control switch M1 is switched OFF, when the second control switch M2 is switched off by the control circuit 20, the buck converter circuit is no longer referenced to ground, and, hence, operates as a floating buck converter.

When the second control switch M2 is ON, the voltage across the inductor L1 is approximately equal to $V_{IN}-V_{OUT}$. In buck mode, this value is positive; thus, the inductor current increases with a slope equal to $(V_{IN}-V_{OUT})/L$. As the inductor current increases, energy is stored in the magnetic field of the inductor L1. Because, M2 is ON, current is supplied to the load D4 and to the output capacitor C1 through the diode D1, and flows to ground through the diode D2.

When the inductor current $i_L$ reaches a peak value, ($i_{peak}$), the control circuit 20 turns the second control switch M2 OFF. At that point, both control switches M1 and M2 are OFF, which causes the circuit including the inductor L1, diodes D1, D3 and D4, and the capacitor C1 of the buck converter to float. The entire output voltage is then dropped over the floating inductor, so that the inductor current decreases with a slope equal to $-V_{OUT}/L$. At this time, however, the circuit between the inductor L1 and the load D4 is completed by the diode D3, which turns on to conduct return current back to the inductor L1.

Figure 5:
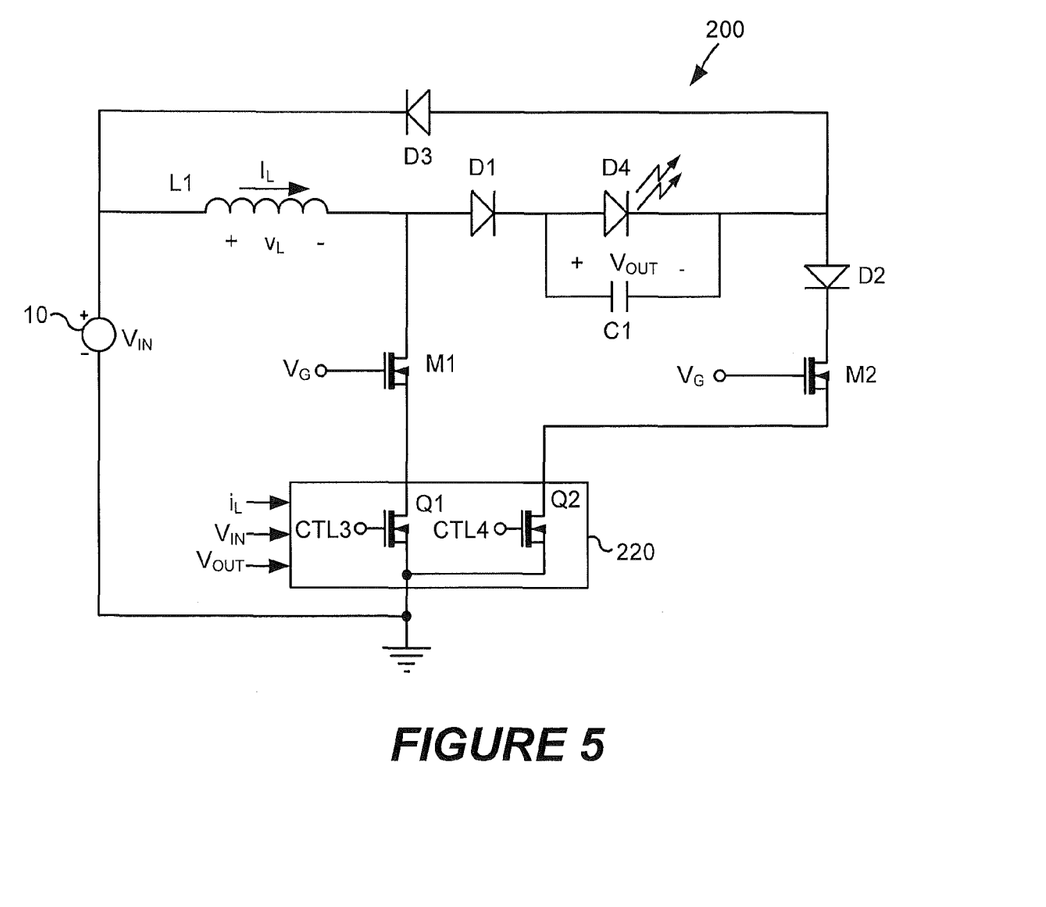
FIG. 5 is a circuit diagram of a voltage converter in accordance with some further embodiments.

FIG. 5 illustrates a boost-floating buck converter 200 according to further embodiments. The boost-floating buck converter 200 of FIG. 5 includes a control circuit 220 that uses internal control signals CTL3, CTL4 to control the state of internal switches Q1, Q2 which are connected in a cascode configuration with the control switches M1, M2, respectively. That is, the output (source) terminals of the control switches M1, M2 are connected to respective drain terminals of the internal switches Q1, Q2, and a constant gate bias $V_G$ (e.g., 18V) is provided to the control terminals (i.e., gates) of the control switches M1, M2. The state of the control switches is therefore controlled by the state of the respective internal switches Q1, Q2. For example, when the internal switch Q1 is turned ON by the control signal CTRL3 generated by the control circuit 220, the first control switch M1 turns ON. Likewise, when the internal switch Q1 is turned OFF by the control signal CTRL3 generated by the control circuit 220, the first control switch M1 turns OFF. The second control switch M2 is operated in a similar manner by the control circuit 220.

During the transition between the boost and buck modes, the controller may chose to operate in a buck-boost mode near the boundary of the boost and buck mode in order to provide a smooth transition. A hysteretic band or window may be used so that the switch between the boost and buck or vice versa happens seamlessly.

In the buck-boost mode, the second control switch M2 is held in the OFF state. When the first control switch M1 is turned ON, the current in the inductor L1 rises with a slope of $V_{IN}/L$. When the first control switch M1 is turned OFF, the current in the inductor L1 goes through the load-capacitor combination of D4-C1 and through D3 as it ramps down with a slope of $-V_{OUT}/L$.

This configuration may provide a more cost effective and/or flexible approach, since the control circuit 220 may not have to generate a control signal having a voltage sufficient to turn on the control switches M1, M2.

Although, FIGS. 2B and 3B show the inductor current in continuous conduction mode with pulse width modulation, other modes of operation, such as discontinuous conduction mode, boundary or critical conduction mode, and modulation schemes such as pulse frequency modulation or constant on-time or constant off-time, or any combination of above, may be used.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A voltage converter, comprising:
   a converter circuit configured to receive an input voltage; and
   a control circuit coupled to the converter circuit and configured to selectively operate the converter circuit in a boost mode in which an inductor stores energy in an output capacitor coupled in parallel to a load or a floating buck mode in which the inductor draws current from the load, in response to a level of the input voltage supplied to the converter circuit,
   wherein the converter circuit is configured to transfer energy from the input voltage directly to an output of the voltage converter responsive to being selectively operated in the boost mode and in the floating buck mode,
   wherein the boost mode has a first circuit topology, and
   wherein the floating buck mode has a second circuit topology different from the first circuit topology.

2. The voltage converter of claim 1, wherein the converter circuit comprises a first control switch coupled to the control circuit, and a second control switch coupled to the control circuit;
   wherein the control circuit is configured to control a state of the first control switch in the boost mode in response to a level of current in the inductor; and
   wherein the control circuit is configured to control a state of the second control switch in the floating buck mode in response to the level of current in the inductor.

3. The voltage converter of claim 2, wherein the converter circuit further comprises:
   a first diode coupled to the inductor wherein the output capacitor is coupled to the first diode;
   wherein the first control switch is coupled to the inductor; and
   wherein the second control switch is coupled to the output capacitor.

4. The voltage converter of claim 3, wherein the converter circuit further comprises:
   a second diode coupled between the output capacitor and the second control switch; and
   a third diode coupled between the second diode and an input terminal that receives the input voltage.

5. The voltage converter of claim 2, wherein the control circuit is coupled to a gate of the first control switch and is configured to provide a first control signal to the gate of the first control switch; and
   wherein the control circuit is coupled to a gate of the second control switch and is configured to provide a second control signal to the gate of the second control switch.

6. The voltage converter of claim 2, wherein the control circuit is coupled to a source of the first control switch and is configured to turn the first control switch ON by selectively coupling the source of the first control switch to ground; and
   wherein the control circuit is coupled to a source of the second control switch and is configured to turn the second control switch ON by selectively coupling the source of the second control switch to ground.

7. The voltage converter of claim 6, wherein the control circuit comprises first and second internal switches coupled in cascode configuration with the first and second control switches, respectively.

8. The voltage converter of claim 4, wherein the converter circuit is configured to discharge energy stored in the inductor through the third diode when the second control switch is turned OFF when the voltage converter is operated in the floating buck mode.

9. The voltage converter of claim 2, wherein both the first and second control switches are referenced to a common ground with the input voltage.

10. The voltage converter of claim 1, wherein the first circuit topology has at least one same circuit element that is common with the second circuit topology and at least one different circuit element that is not common to the second circuit topology.

11. A control circuit for a voltage converter including an inductor and first and second control switches, the control circuit comprising:
a first input configured to receive an inductor current signal;
a second input configured to receive an input voltage signal; and
a third input configured to receive an output voltage signal;
a first output coupled to the first control switch;
a second output coupled to the second control switch;
wherein the control circuit is configured to operate the voltage converter in one of a boost mode and a buck mode in response to a level of the input voltage signal relative to a level of the output voltage signal;
wherein in the boost mode, the control circuit is configured to turn ON the second control switch and to modulate a state of the first control switch in response to a level of current in the inductor; and
wherein in the buck mode, the control circuit is configured to turn OFF the first control switch and to modulate a state of the second control switch in response to the level of current in the inductor.

12. The control circuit of claim 11, wherein the first output of the control circuit is coupled to a control terminal of the first control switch and the second output of the control circuit is coupled to a control terminal of the second control switch; and
wherein the control circuit is configured to control a state of the first control switch by supplying a first control signal to the control terminal of the first control switch, and the control circuit is configured to control a state of the second control switch by supplying a second control signal to the control terminal of the second control switch.

13. The control circuit of claim 11, wherein the first output of the control circuit is coupled to an output terminal of the first control switch and the second output of the control circuit is coupled to an output terminal of the second control switch; and
wherein the control circuit is configured to control a state of the first control switch by selectively coupling the output terminal of the first control switch to ground, and the control circuit is configured to control a state of the second control switch by selectively coupling the output terminal of the second control switch to ground.

14. A voltage converter circuit, comprising:
an input node configured to receive an input voltage;
an inductor having a first inductor terminal coupled to the input node and having a second inductor terminal;
a first diode having a first anode coupled to the second inductor terminal of the inductor and a first cathode coupled to an output node;
a capacitor having a first capacitor terminal coupled to the output node and having a second capacitor terminal;
a second diode having a second anode coupled to the second capacitor terminal of the capacitor and having a second cathode;
a third diode having a third anode coupled to the second anode of the second diode and having a third cathode coupled to the input node;
a first control switch having a first switch terminal coupled to the second inductor terminal of the inductor, and having a first control terminal;
a second control switch having a second switch terminal coupled to the second cathode of the second diode and having a second control terminal; and
a control circuit coupled to the first control terminal of the first control switch and the second control terminal of the second control switch and configured to control a respective state of the first control switch and the second control switch,
wherein the voltage converter circuit is configured to discharge energy stored in the inductor through the third diode when the second control switch is turned OFF when the voltage converter circuit is operated in a buck mode.

15. The voltage converter circuit of claim 14, wherein the control circuit is configured to turn the second control switch ON and to modulate a state of the first control switch in a boost mode in response to a level of current in the inductor; and
wherein the control circuit is configured to turn the first control switch OFF and modulate a state of the second control switch in a buck mode in response to the level of current in the inductor.

16. The voltage converter circuit of claim 15, wherein the first control terminal of the first control switch comprises a gate terminal, and the control circuit is configured to provide a first control signal to the gate terminal of the first control switch; and
wherein the second control terminal of the second control switch comprises a gate terminal, and the control circuit is configured to provide a second control signal to the gate terminal of the second control switch.

17. The voltage converter circuit of claim 15, wherein the first control terminal of the first control switch comprises a source of the first control switch, and the control circuit is configured to turn the first control switch ON by selectively coupling the source of the first control switch to ground; and
wherein the second control terminal of the second control switch comprises a source terminal, and the control circuit is configured to turn the second control switch ON by selectively coupling the source terminal of the second control switch to ground.

18. The voltage converter circuit of claim 17, wherein the control circuit comprises first and second internal switches coupled in cascode configuration with the first and second control switches, respectively.

* * * * *